United States Patent
Kajita et al.

(10) Patent No.: US 8,294,846 B2
(45) Date of Patent: Oct. 23, 2012

(54) LIQUID CRYSTAL DISPLAY DEVICE

(75) Inventors: Daisuke Kajita, Hitachi (JP); Masahiro Ishii, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 383 days.

(21) Appl. No.: 12/647,007

(22) Filed: Dec. 24, 2009

(65) Prior Publication Data

US 2010/0165238 A1 Jul. 1, 2010

(30) Foreign Application Priority Data

Dec. 25, 2008 (JP) .................................. 2008-331258

(51) Int. Cl.
*G02F 1/1333* (2006.01)

(52) U.S. Cl. ............................................ 349/64

(58) Field of Classification Search .................. None
See application file for complete search history.

(56) References Cited

U.S. PATENT DOCUMENTS

| | | | |
|---|---|---|---|
| 6,513,943 B2 | 2/2003 | Fukuyoshi | |
| 6,559,834 B1 | 5/2003 | Murakami et al. | |
| 7,110,177 B2 | 9/2006 | Sugino et al. | |
| 7,355,211 B2 | 4/2008 | Tanaka et al. | |
| 7,379,128 B2 * | 5/2008 | Tsubokura et al. | 349/60 |
| 7,423,708 B2 | 9/2008 | Weber et al. | |
| 7,567,316 B2 * | 7/2009 | Hu | 349/58 |
| 2009/0162617 A1 | 6/2009 | Moroishi et al. | |

FOREIGN PATENT DOCUMENTS

| | | |
|---|---|---|
| JP | 2001-142638 | 5/2001 |
| JP | 3448626 | 7/2003 |
| JP | 2003-279748 | 10/2003 |
| JP | 2004-151550 | 5/2004 |
| JP | 2005-201938 | 7/2005 |
| JP | 2005-301147 | 10/2005 |
| JP | 2005-302336 | 10/2005 |
| JP | 2005-347272 | 12/2005 |
| JP | 2007-065644 | 3/2007 |
| JP | 2008-243803 | 10/2008 |

* cited by examiner

*Primary Examiner* — Thanh-Nhan P Nguyen

(74) *Attorney, Agent, or Firm* — Antonelli, Terry, Stout & Kraus, LLP.

(57) ABSTRACT

The liquid crystal display device capable of reducing warp includes a liquid crystal display portion (6) and a backlight device (10) provided on a side opposite to a display surface of the liquid crystal display portion (6). The liquid crystal display portion (6) includes polarizing plates (1) and (2) and the backlight device (10) includes N (N≧1) optical members. When the N optical members are denoted by reference numerals 1, 2, . . . , and N in the stated order from a side on which the liquid crystal display portion (6) is provided, the optical member 1 is brought into intimate contact with the liquid crystal display portion (6) via an adhesive, and strain per unit length on the optical member 1 at least one of −10 to 10° C. and 40 to 70° C. is ⅕ or smaller of strain per unit length on the polarizing plates (1) and (2).

13 Claims, 10 Drawing Sheets

LIQUID CRYSTAL DISPLAY DEVICE

CROSS-REFERENCE TO RELATED APPLICATION

The present application claims priority from Japanese application JP 2008-331258 filed on Dec. 25, 2008, the content of which is hereby incorporated by reference into this application.

BACKGROUND OF THE INVENTION

1. Field of the Invention

The present invention relates to a liquid crystal display device. More particularly, the present invention relates to a liquid crystal display device which is capable of reducing occurrence of nonuniform display caused by warp in a liquid crystal display portion due to an external environment.

2. Description of the Related Art

A liquid crystal display device has advantages of high display performance, low power consumption, a low profile, being lightweight, and the like, and is now widely applied to, for example, a cellular mobile phone, a digital camera, a monitor for a personal computer (PC), and a television (TV) set.

FIGS. 1 and 2 illustrate structures of a typical liquid crystal display device. In FIG. 1, a liquid crystal display portion 6 includes a first polarizing plate 1 on a light incident side and a second polarizing plate 2 on a light emitting side. A liquid crystal layer 5 is provided between a first substrate 3 and a second substrate 4. An electrode group is provided on at least one of the first substrate 3 and the second substrate 4 so that voltage is applicable to the liquid crystal layer 5 with respect to each pixel. A backlight device 10 includes a light source 7, a backlight device frame 8, and an optical member group 9.

In a typical liquid crystal display device, the substrates 3 and 4 are made of glass and their expansion coefficient which depends on an external environment (temperature and humidity) greatly differs from that of the polarizing plates 1 and 2. As a result, as described in JP 2003-279748 A, the liquid crystal display portion 6 warps depending on a state of the backlight device (power on/off and applied power) and an external environment (weather and geographic area).

Referring to FIG. 2, in the typical liquid crystal display device, the liquid crystal display portion 6 is mounted on the backlight device 10 and is fixed by a frame member 8-1. Therefore, when the liquid crystal display portion 6 warps to a great extent, the liquid crystal display portion 6 is brought into contact with the frame member 8-1 or the optical member group 9. Here, part of the liquid crystal display portion 6 is pressed from the front or from the rear, which disturbs orientation of liquid crystal molecules in the liquid crystal layer 5, resulting in occurrence of nonuniform display.

JP 2005-301147 A discloses a method of joining a backlight device and a liquid crystal display portion together for the purpose of preventing distortion of sheet-like optical members of the backlight device. This method enables prevention of distortion and misalignment of the optical members. However, according to study by the inventors of the present invention, the extent of the above-mentioned warp in the liquid crystal display portion becomes greater on the contrary.

Conventionally, when warp in a liquid crystal display portion becomes a problem, as illustrated in FIG. 2, the frame member 8-1 and a frame member 8-2 are provided so that there is a sufficient clearance between the liquid crystal display portion 6 and the frame member 8-1 or between the liquid crystal display portion 6 and the optical member group 9. However, if those clearances are too large, such a problem of mechanical reliability arises that the liquid crystal display portion 6 is not fixed and misalignment occurs.

Further, JP 2008-243803 A describes a liquid crystal display device in which an optical member group and a liquid crystal display portion are joined together; JP 2007-65644 A, a resin substrate material and a glass material whose amounts of strain are small; JP 2005-302336 A, a low refractive index layer; and JP 3448626 B, a reflective polarizer which functions as required by a structure in an optical member.

The above-mentioned problem which accompanies warp in a liquid crystal display portion is expected to become more obvious in the future in accordance with the recent trend toward a greater display of a liquid crystal display device and higher quality of display of a liquid crystal display device.

SUMMARY OF THE INVENTION

The present invention has been made in view of the above-mentioned problem, and an object of the present invention is to provide a liquid crystal display device including a polarizing plate and a lighting device, which is capable of reducing warp in a liquid crystal display portion due to an external environment without increasing material cost and a thickness of the liquid crystal display device and without loss of mechanical reliability.

Of aspects of the present invention disclosed by the subject application, a brief outline of representative aspects is described as follows.

(1) A liquid crystal display device, including: a liquid crystal display portion; and a backlight device provided on a side opposite to a display surface of the liquid crystal display portion, in which: the liquid crystal display portion includes a polarizing plate; the backlight device includes N ($N \geq 1$) optical members; and when the N optical members are denoted by reference numerals 1, 2, . . . , and N in the stated order from a side on which the liquid crystal display portion is provided, the optical member 1 is brought into intimate contact with the liquid crystal display portion via an adhesive, and strain per unit length on the optical member 1 at least one of −10 to 10° C. and 40 to 70° C. is ⅕ or smaller of strain per unit length on the polarizing plate.

(2) A liquid crystal display device, including: a liquid crystal display portion; and a backlight device provided on a side opposite to a display surface of the liquid crystal display portion, in which: the liquid crystal display portion includes a polarizing plate; the backlight device includes N ($N \geq 2$) optical members; and when the N optical members are denoted by reference numerals 1, 2, . . . , and N in the stated order from a side on which the liquid crystal display portion is provided, the optical member 1 is brought into intimate contact with the liquid crystal display portion via an adhesive, and the optical member M ($1 < M \leq N$) is brought into intimate contact with the optical member M−1 via an adhesive, and strain per unit length on an optical member having a highest flexural rigidity (product of Young's modulus and second moment of area) among the N optical members at least one of −10 to 10° C. and 40 to 70° C. is ⅕ or smaller of strain per unit length on the polarizing plate.

(3) In the liquid crystal display device according to item (1) or (2), at least one optical member of the N optical members has a surface with concavo-convex shape formed thereon, and the liquid crystal display device further includes a low refractive index layer having a refractive index of 1 or larger and 1.4 or smaller at the surface with the concavo-convex shape formed thereon one of between the optical member having the concavo-convex shape formed thereon and an optical member adjacent to the optical member having the concavo-convex shape formed thereon, or between the optical member having the concavo-convex shape formed thereon and the liquid crystal display portion.

(4) In the liquid crystal display device according to item (1) or (2), at least one optical member of the N optical members is a light guide plate for guiding light emitted from a light source of the backlight device in a planar direction, and the liquid crystal display device further includes a low refractive index layer having a refractive index of 1 or larger and 1.4 or smaller on a light emitting surface side of the light guide plate one of between the light guide plate and an optical member adjacent to the light guide plate, or between the light guide plate and the liquid crystal display portion.

(5) In the liquid crystal display device according to item (1) or (2), an optical member having a highest flexural rigidity among the N optical members includes glass as a main material.

(6) A liquid crystal display device, including: a liquid crystal display portion; and a backlight device provided on a side opposite to a display surface of the liquid crystal display portion, in which: the liquid crystal display portion includes: a first polarizing plate on a light incident side; a second polarizing plate on a light emitting side; and a transparent layer provided on a light incident side of the first polarizing plate; and when a thickness of the transparent layer is represented by $h_t$ and expressed as:

$$h_{t0} = \frac{\varepsilon_{p2} E_{p2} h_{p2}(h_{p2} + h_g) - \varepsilon_{p1} E_{p1} h_{p1}(h_{p1} + h_g)}{\varepsilon_t E_t (h_g + 2h_{p1})} \quad \text{[Equation 1]}$$

where $\varepsilon$, E, and h are strain per unit length under an environment in which temperature of the liquid crystal display portion is at least one of −10 to 10° C. and 40 to 70° C., and a Young's modulus, a thickness of each member, respectively, and indexes p1, p2, g, and t correspond to the first polarizing plate, the second polarizing plate, a substrate of the liquid crystal display portion, and the transparent layer, respectively, $0.5h_{t0} \leq h_t \leq 1.5h_{t0}$ is satisfied.

(7) A liquid crystal display device, including: a liquid crystal display portion; and a backlight device provided on a side opposite to a display surface of the liquid crystal display portion, in which: the liquid crystal display portion includes: a first polarizing plate on a light incident side; a second polarizing plate on a light emitting side; and a transparent layer provided on a light emitting side of the second polarizing plate; and when a thickness of the transparent layer is represented by $h_t$ and expressed as:

$$h_{t0} = \frac{\varepsilon_{p1} E_{p1} h_{p1}(h_{p1} + h_g) - \varepsilon_{p2} E_{p2} h_{p2}(h_{p2} + h_g)}{\varepsilon_t E_t (h_g + 2h_{p2})} \quad \text{[Equation 2]}$$

where $\varepsilon$, E, and h are strain per unit length under an environment in which temperature of the liquid crystal display portion is at least one of −10 to 10° C. and 40 to 70° C., and a Young's modulus, a thickness of each member, respectively, and indexes p1, p2, g, and t correspond to the first polarizing plate, the second polarizing plate, a substrate of the liquid crystal display portion, and the transparent layer, respectively, $0.5h_{t0} \leq h_t \leq 1.5h_{t0}$ is satisfied.

(8) In the liquid crystal display device according to item (6), the transparent layer includes an optical member of the backlight device.

(9) In the liquid crystal display device according to item (7), the transparent layer includes a surface treated layer of the second polarizing plate.

(10) In the liquid crystal display device according to item (6), the transparent layer includes a support base provided on a side of the backlight device of the first polarizing plate.

(11) In the liquid crystal display device according to item (7), the transparent layer includes a support base provided on the light emitting side of the second polarizing plate.

(12) In the liquid crystal display device according to item (1), (2), (6), or (7), the liquid crystal display device further includes a frame member for, by pressing an end portion of the liquid crystal display portion from a light emitting surface side of the liquid crystal display portion, fixing a position of the liquid crystal display portion, and a clearance between an outermost surface on the light emitting side of the liquid crystal display portion and the frame member is equal to or smaller than 1.5 mm.

(13) In the liquid crystal display device according to item (6) or (7), the backlight device includes N (N≧1) optical members, no structure is provided for providing a clearance between the liquid crystal display portion and the backlight device, and the liquid crystal display portion is directly mounted on the N optical members.

According to the liquid crystal display device of the present invention described above, warp in the liquid crystal display portion due to an external environment may be reduced without increasing the material cost and the thickness of the liquid crystal display device and without loss of the mechanical reliability.

DETAILED DESCRIPTION OF THE INVENTION

First, warp in a liquid crystal display portion is described in detail. The amount of warp in a liquid crystal display portion is predominantly in direct proportion to the length of a side, and hence only a long side direction is considered in the following and one-dimensional analysis is carried out.

Figure 3:
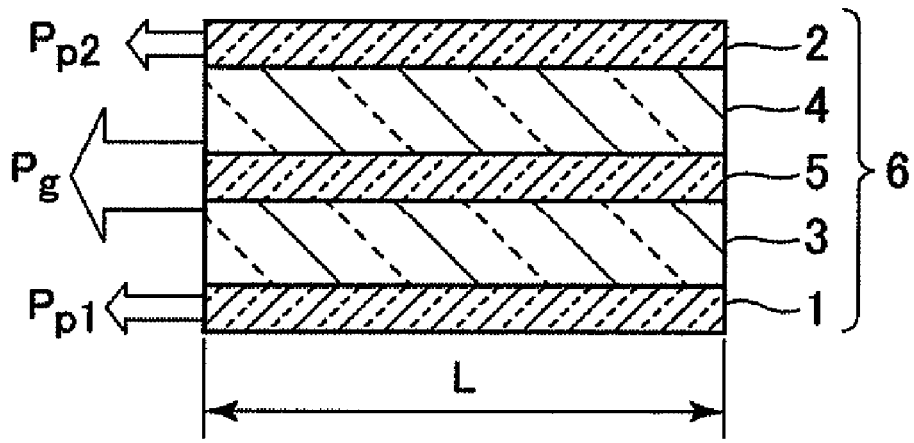
FIG. 3 is a conceptual diagram for illustrating factors of warp in a liquid crystal display device.

In a liquid crystal display portion 6 illustrated in FIG. 3, strain (strain per unit length) on a first polarizing plate 1 under a certain environment is represented $\epsilon_{p1}$ by and strain on a second polarizing plate 2 is represented by $\epsilon_{p2}$.

Generally, strain E is expressed as $\alpha \Delta T/L_0$ where $\alpha$ is the linear expansion coefficient, $\Delta T$ is the temperature change with respect to temperature of when a polarizing plate and a substrate are joined together, and $L_0$ is the length of when the temperature change is zero. With regard to a metal material or the like, the strain changes substantially linearly with temperature change. However, especially with regard to a polarizing plate, there is another strain due to humidity change in addition to strain due to temperature change, and thus the strain does not change linearly with temperature change. Therefore, a discussion in the following regarding the effect of the present invention completely holds under a certain environment but may not completely hold under another environment.

For example, a polarizing plate and a substrate are joined together normally at ordinary temperature, and of course, warp in the liquid crystal display portion is not a serious problem under an environment at temperatures in the neighborhood of ordinary temperature. In other words, the liquid crystal display portion does not warp even without the present invention. A problem arises when a liquid crystal display device is under an environment in which the temperature is other than ordinary temperature, for example, −10 to 10° C. or 40 to 70° C. Depending on the application of the liquid crystal display device, an environment which is thought to be important differs. For example, when the liquid crystal display device is mounted on a vehicle in an equatorial area, it is thought to be important to reduce warp in the liquid crystal display portion in a high temperature and high humidity environment at about 70° C. In this case, the present invention should be applied estimating strain on the polarizing plate in the case of 70° C. Then, warp in the liquid crystal display portion is significantly improved at 70° C., and is also improved in the range from ordinary temperature to 70° C. compared with a case in which the present invention is not applied.

More specifically, the object of the present invention may be sufficiently attained if the discussion of the present invention holds when the liquid crystal display device is under an environment in which the temperature and humidity are other than ordinary temperature and humidity, for example, −10 to 10° C. or 40 to 70° C. Strain on the polarizing plate under 70° C. 40% RH environment, for example, as used herein is defined as strain per unit length on the polarizing plate of when the liquid crystal display device is under the 70° C. 40% RH environment for one hour with respect to the polarizing plate of when the liquid crystal display device is under a reference environment. The reference environment of when the strain is zero is an environment of when the polarizing plate and the substrate are joined together.

The thicknesses of the first polarizing plate 1 and the second polarizing plate 2 are represented by $h_{p1}$ and $h_{p2}$, respectively. The lengths of a long side and a short side of the liquid crystal display portion 6 are represented and expressed as L and l, respectively (the discussion in the following is independent of the length of the short side). The influence of the liquid crystal layer 5 is ignored, and the total thickness of the first substrate 3 and the second substrate 4 is represented by $h_g$. Strains on the substrates are very small compared with the strains on the polarizing plates, and therefore are ignored. Because the polarizing plates and the substrates are in intimate contact with each other, vertical forces as illustrated in FIG. 3 are produced at a section of the liquid crystal display portion, which are expressed by the following equations. Here, the elastic modulus of the polarizing plates are very small compared with the elastic modulus of the substrates, and further, in a typical liquid crystal display device, the thicknesses of the substrates are equal to or larger than the thicknesses of the polarizing plates, and thus, "$h_{p1}E_{p1}+h_gE_g+h_{p2}E_{p2} \approx h_gE_g$" is satisfied.

$$P_{p1} = \epsilon_{p1}E_{p1}h_{p1}$$

$$P_g = -\epsilon_{p1}E_{p1}h_{p1} - \epsilon_{p2}E_{p2}h_{p2}$$

$$P_{p2} = \epsilon_{p2}E_{p2}h_{p2} \qquad \text{[Equation 3]}$$

where $E_{p1}$, $E_{p2}$, and $E_g$ are the Young's modulus of the first polarizing plate 1, of the second polarizing plate 2, and of the substrates 3 and 4, respectively. From conditions of force balance, a total sum of the vertical forces is always zero.

The vertical force causes bending moment M, which is expressed by the following equation. Moment which warps the liquid crystal display portion so as to be U-shaped (with a peak on a bottom side) is regarded as positive.

$$M = \frac{1}{2}(P_{p1}h_{p1} + P_g h_g + P_{p2}h_{p2}) + P_g h_{p2} + P_{p1}(h_g + h_{p2}) \qquad \text{[Equation 4]}$$

If the first polarizing plate 1 and the second polarizing plate 2 are exactly the same, and $h_{p1}=h_{p2}$ and $\epsilon_{p1}=\epsilon_{p2}$, $P_{p1}=P_{p2}$ is established. From the conditions of force balance, it follows that $P_g=-2P_{p1}$ and M=0. In other words, in this case, the liquid crystal display portion does not warp.

However, in a liquid crystal display device, which is now often used in a TV set, a digital camera, a cellular mobile phone, and the like, which are required to attain high display performance, the first polarizing plate 1 and the second polarizing plate 2 are provided so that the absorption axes thereof are orthogonal to each other. This is applicable to, for example, a liquid crystal display device in such a liquid crystal display mode as an in-plane-switching (IPS) mode or a vertical-alignment (VA) mode.

According to the study by the inventors of the present invention, the strain and the Young's modulus of a polarizing plate greatly differ depending on whether the direction is in parallel with or perpendicular to an extension axis. For example, in Eqs. 3 and 4, if $\epsilon_{p1}=2\epsilon_{p2}$, $h_{p1}=h_{p2}$, and $E_{p1}=E_{p2}$, the bending moment M is expressed by the following equation. In other words, the liquid crystal display portion warps with a peak on the bottom side.

$$M = \frac{h_{p1} + h_g}{2} \varepsilon_{p2} E_{p2} h_{p2} \qquad \text{[Equation 5]}$$

Here, the amount of warp at an end portion of the liquid crystal display portion is expressed by the following equation. In Eq. 6, L is the length of a long side of the liquid crystal display device and $I_{p1}$, $I_g$, and $I_{p2}$ are second moment of area of the first polarizing plate, second moment of area of a lamination of the first substrate and the second substrate, and second moment of area of the second polarizing plate, respectively.

$$v = \frac{M}{2(E_{p1}I_{p1} + E_g I_g + E_{p2}I_{p2})} L^2 \qquad \text{[Equation 6]}$$

An exemplary embodiment of the present invention is specifically described in the following.

Based on Eq. 6, in order to reduce warp in the liquid crystal display portion, the second moment of area of the structural members is made to be larger or the bending moment M is made to be smaller.

First, a method of making larger the second moment of area of the structural members is described. In order to make larger the second moment of area, the members are made to be thicker. The second moment of area is approximately in direct proportion to the third power of the thickness. Because, meanwhile, as may be seen from Eqs. 3 to 5, the bending moment M is approximately in direct proportion to the second power of the thickness, this is an effective measure to be considered. However, when a member which may have larger strain such as a polarizing plate is made to be thicker, depending on the extent of the strain, the bending moment M may become extremely large, which may make greater the extent of warp in the liquid crystal display device on the contrary. The simplest way is to make thicker the substrate, which may have smaller strain. However, taking into consideration the material cost, the manufacturing process, and the like, this is not realistic.

Figure 4:
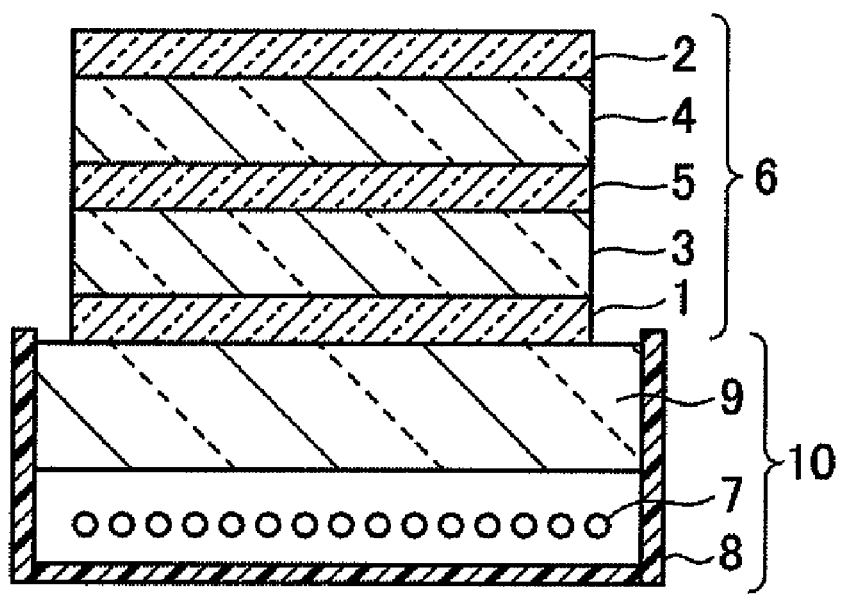
FIG. 4 illustrates a structure of a liquid crystal display device according to an exemplary embodiment of the present invention.

FIG. 4 illustrates a structure of a liquid crystal display device according to the exemplary embodiment of the present invention.

A liquid crystal display portion 6 and an optical member group 9 of a backlight device 10 are joined together so as to be in intimate contact with each other via an adhesive. A typical backlight device includes an optical member having a thickness of several millimeters, which is, for example, a diffuser used in a backlight device in which light sources are spread within a surface of the backlight device immediately below the liquid crystal display portion, or a light guide plate for guiding light emitted from a light source provided only at an end portion of the backlight device, and taking out the light to a front side thereof. Here, when the number of the existing optical members is N, the optical members are denoted by reference numerals 1, 2, . . . , and N in this order from a side on which the liquid crystal display portion 6 is provided.

In a typical liquid crystal display device, whereas the polarizing plate has a thickness of about 0.2 mm and the substrate has a thickness of about 0.7 mm, the diffuser or the light guide plate has a thickness of about 2 to 5 mm. Therefore, it is possible to significantly improve the flexural rigidity (product of the second moment of area and the Young's modulus) of the liquid crystal display device. Further, this method does not increase the thickness of the liquid crystal display device and does not increase the cost due to an additional member.

However, the linear expansion coefficient of a diffuser or a light guide plate, which is used in a typical liquid crystal display device, is similar to that of a polarizing plate. Therefore, the bending moment becomes significantly large, and the amount of warp in a high temperature environment or in a low temperature environment becomes larger on the contrary. Also in JP 2005-301147 A and JP 2008-243803 A, similarly to the case illustrated in FIG. 4, an optical member group and a liquid crystal display portion are joined together. However, merely joining a typical optical member and a liquid crystal display portion together results in large bending moment, and the extent of warp in the liquid crystal display portion becomes greater on the contrary. To select the characteristics of the optical member to be joined to the liquid crystal display portion is very important.

According to the study by the inventors of the present invention, in the structure illustrated in FIG. 4, the amount of strain of at least a member which has the highest flexural rigidity among members in the optical member group 9 has to be so small compared with that of the polarizing plate as to be ignorable. A resin substrate material and glass described in JP 2007-65644 A satisfy the condition described above.

Figure 5:
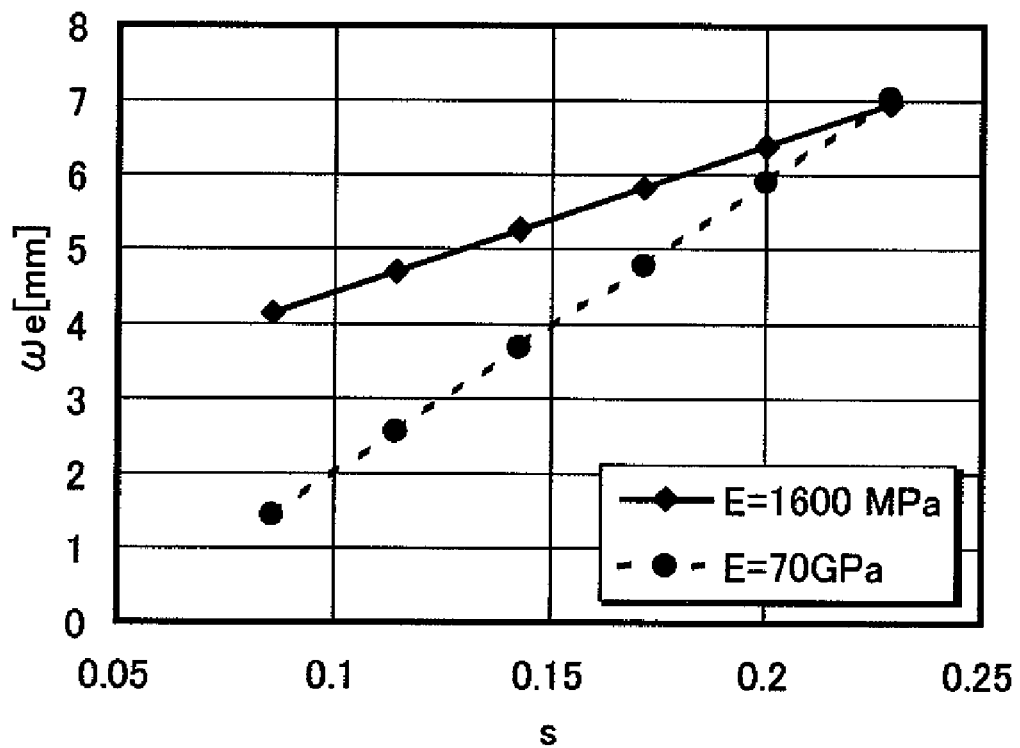
FIG. 5 is a graph for illustrating the exemplary embodiment of the present invention.

FIG. 5 illustrates results of determination of the amount of warp at an end portion of the liquid crystal display portion under a certain environment in a case where strain on the optical member is changed relative to the polarizing plate. In FIG. 5, the horizontal axis represents the relative strain s on the optical member with the strain on the polarizing plate being 1, while the vertical axis represents the amount of warp $w_e$ at an end portion of the liquid crystal display portion. The thickness of the optical member is 2 mm. The measurement is carried out both in the case where the Young's modulus E of the optical member is as small as 1,600 MPa (case in which the optical member is made of a resin substrate material is assumed) and in the case where the Young's modulus E of the optical member is as large as 70 GPa (case in which the optical member is made of glass is assumed). When the optical member is not joined to the liquid crystal display portion, the amount of warp at the end portion is about 6.5 mm. Therefore, when the strain on the optical member is 1/5 or smaller of that on the polarizing plate, the above-mentioned effect may be produced.

Another problem is optical characteristics of the liquid crystal display device. There may be a case in which an optical member in the optical member group having a specific surface shape to give significant characteristics to the liquid crystal display device is provided. For example, a prism sheet is also called a brightness improving film and, by prism-like concavo-convex shape on a surface of the prism sheet, light emitted from the backlight device is made to be directional to improve the brightness of the liquid crystal display device seen from the front. Such an optical member utilizes transmission, reflection, and refraction of light, and all of those are on the precondition that there is a difference between the refractive index of the member and the refractive index of air.

However, if the liquid crystal display portion 6 and the optical member group 9 are in intimate contact with each other as illustrated in FIG. 4, because the refractive index of a typical adhesive is close to the refractive index of the optical member, the difference in the refractive index between the inside and the outside of the optical member is significantly small, and hence the optical member having a specific surface shape cannot function satisfactorily.

Figure 6:
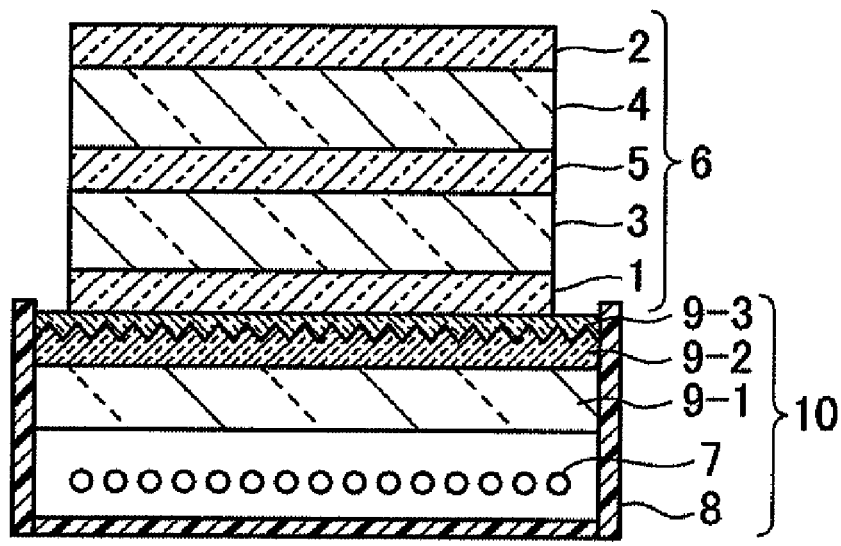
FIG. 6 illustrates a structure of the liquid crystal display device according to the exemplary embodiment of the present invention.

Therefore, as illustrated in FIG. 6, a low refractive index layer is provided on a surface of an optical member having a specific surface shape on the side of the concavo-convex shape. In FIG. 6, reference numerals 9-1 to 9-3 represent an optical member group, which includes a member having the highest flexural rigidity among the optical members. The reference numeral 9-2 denotes the prism sheet while the reference numeral 9-3 denotes the low refractive index layer. All of the optical members 9-1, 9-2, and 9-3 and the liquid crystal display portion 6 are in intimate contact with one another via an adhesive. The exemplary low refractive index layer may be, for example, the one described in JP 2005-302336 A. The refractive index of a typical optical member is approximately 1.5, and if, though depending on the refractive index of the optical member, the refractive index of the low refractive index layer 9-3 is 1.4 or smaller, the optical member may function satisfactorily. Preferably, the refractive index of the low refractive index layer 9-3 is 1.2 or smaller. Taking into consideration the relationship with the refractive index of air, the refractive index of the low refractive index layer 9-3 is preferably 1.0 or larger.

Even if the optical member does not have a specific surface shape, a light guide plate, for example, is a member which causes transmission, reflection, and refraction utilizing the difference in the refractive index from air. The above-mentioned method is effective also with regard to such a member. On the other hand, the low refractive index layer is not necessary for an optical member which functions as required by a structure in the optical member, for example, a reflective polarizer described in JP 3448626B.

Next, a method of making smaller the bending moment M is described. In order to make smaller the bending moment M, the difference in the strain between structural members is made to be smaller, the Young's modulus or the thickness of a structural member which may have large strain is made to be smaller, or the like.

In particular, the polarizing plate is a member whose optical characteristics greatly affect the display performance of the liquid crystal display device, and thus, it is very difficult to adjust the characteristics of the polarizing plate.

Figure 7:
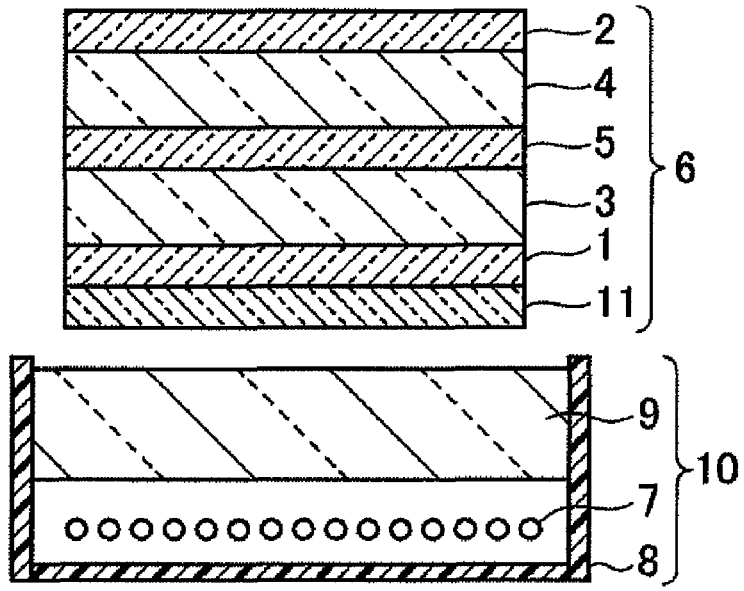
FIG. 7 illustrates a structure of the liquid crystal display device according to the exemplary embodiment of the present invention.

Therefore, as illustrated in FIG. 7, a transparent film or a transparent thin film 11 is added to the first polarizing plate 1 or the second polarizing plate 2. As described with reference to Eqs. 3 and 4, warp in the liquid crystal display portion is mainly controlled by the difference between the vertical forces produced at sections of the first polarizing plate and the second polarizing plate, respectively. Therefore, if the difference in the vertical forces may be compensated for by the transparent thin film 11, the bending moment may be made to be smaller. Further, if the transparent thin film 11 is provided outside the polarizing plate (on a side opposite to the liquid crystal display portion 6) as illustrated in FIG. 7, the birefringence of the liquid crystal display portion 6 is not affected and the display performance of the liquid crystal display device is not affected as well. With regard to the optical characteristics of the transparent thin film 11, from the viewpoint of suppressing interface reflection, it is sufficient that the refractive index of the transparent thin film 11 be about 1.5, which may be easily satisfied by various kinds of organic materials.

On the other hand, it is not realistic to make specifications about the strain and the Young's modulus, which are mechanical properties of the transparent thin film 11. In order to suppress increase in the material cost, it is not possible to select a mechanical property. More specifically, it is good to, on the assumption that a material which is desirable from the viewpoint of the material cost and the manufacturing cost is given, regard the thickness of the transparent thin film 11 as a factor in design.

Figure 8:
FIG. 8 illustrates a structure for illustrating the exemplary embodiment of the present invention.
Figure 9:
FIG. 9 illustrates a structure for illustrating the exemplary embodiment of the present invention.

In order to determine the necessary thickness of the transparent thin film 11, a thought experiment is conducted. In FIG. 8, the second polarizing plate 2 is joined to a substrate 4 so as to be in intimate contact therewith. In FIG. 9, the first polarizing plate 1 and the transparent thin film 11 are joined to a substrate 3 so as to be in intimate contact therewith. When the elements illustrated in FIGS. 8 and 9 are under a certain environment and the shapes of the warp are exactly the same, the liquid crystal display portion 6 illustrated in FIG. 7 does not warp.

For example, a case is considered in which the element illustrated in FIG. 8 under a certain environment warps with a peak on a top side and the amount of warp is 10 mm while the element illustrated in FIG. 9 warps with a peak on a top side and the amount of warp is 5 mm without the transparent thin film 11 being provided thereon. If the transparent thin film 11 whose strain is positive (which expands under this environment) is provided as illustrated in FIG. 9 and the thickness of the transparent thin film it is gradually made to be larger, the shapes of the warp in the elements illustrated in FIGS. 8 and 9 should be exactly the same when the thickness has a certain value. If the elements illustrated in FIGS. 8 and 9 in this state are combined to form the liquid crystal display portion, the liquid crystal display portion does not warp.

The optimal thickness of the transparent thin film 11 is determined. If the transparent thin film 11 is thinner than the substrates 3 and 4 and the Young's modulus of the transparent thin film 11 is smaller than that of the substrates 3 and 4, the bending moments of the elements illustrated in FIGS. 8 and 9 are made to be the same.

First, from Eqs. 3 and 4, the bending moment $M_{p2}$ of the element illustrated in FIG. 8 is expressed by the following equation.

$$M_{p2} = -\frac{h_{p2} + h_g}{2}\varepsilon_{p2}E_{p2}h_{p2} \quad \text{[Equation 7]}$$

The bending moment $M_{p1}$ of the element illustrated in FIG. 9 is expressed by the following equation, where $\varepsilon_t$, $h_t$, and $E_t$ are the strain, the thickness, and the Young's modulus, respectively, of the transparent thin film 11. As described above, $\varepsilon_t$ and $E_t$ are assumed to be already given.

$$M_{p1} = -\frac{h_{p1} + h_g}{2}\varepsilon_{p1}E_{p1}h_{p1} - \frac{h_t + h_g}{2}\varepsilon_t E_t h_t - \varepsilon_t E_t h_t h_{p1} \quad \text{[Equation 8]}$$

$h_t$ for which $M_{p2}=M_{p1}$ holds is given by the following equation. Here, $h_t^2$ is so small as to be ignored.

$$h_t = \frac{\varepsilon_{p2}E_{p2}h_{p2}(h_{p2} + h_g) - \varepsilon_{p1}E_{p1}h_{p1}(h_{p1} + h_g)}{\varepsilon_t E_t(h_g + 2h_{p1})} \quad \text{[Equation 9]}$$

In the above equation, when the numerator is larger than zero, it is necessary to select a thin film material in which $\epsilon_f > 0$. When the numerator is smaller than zero, it is necessary to select a thin film material in which $\epsilon_f < 0$. Further, in FIG. 9, the transparent thin film 11 is joined to the first polarizing plate 1, but may be joined to the second polarizing plate 2. In this case, $h_t$ for which $M_{p2} = M_{p1}$ holds is given by the following equation.

$$h_t = \frac{\varepsilon_{p1} E_{p1} h_{p1}(h_{p1} + h_g) - \varepsilon_{p2} E_{p2} h_{p2}(h_{p2} + h_g)}{\varepsilon_t E_t(h_g + 2h_{p2})} \quad \text{[Equation 10]}$$

Figure 10:
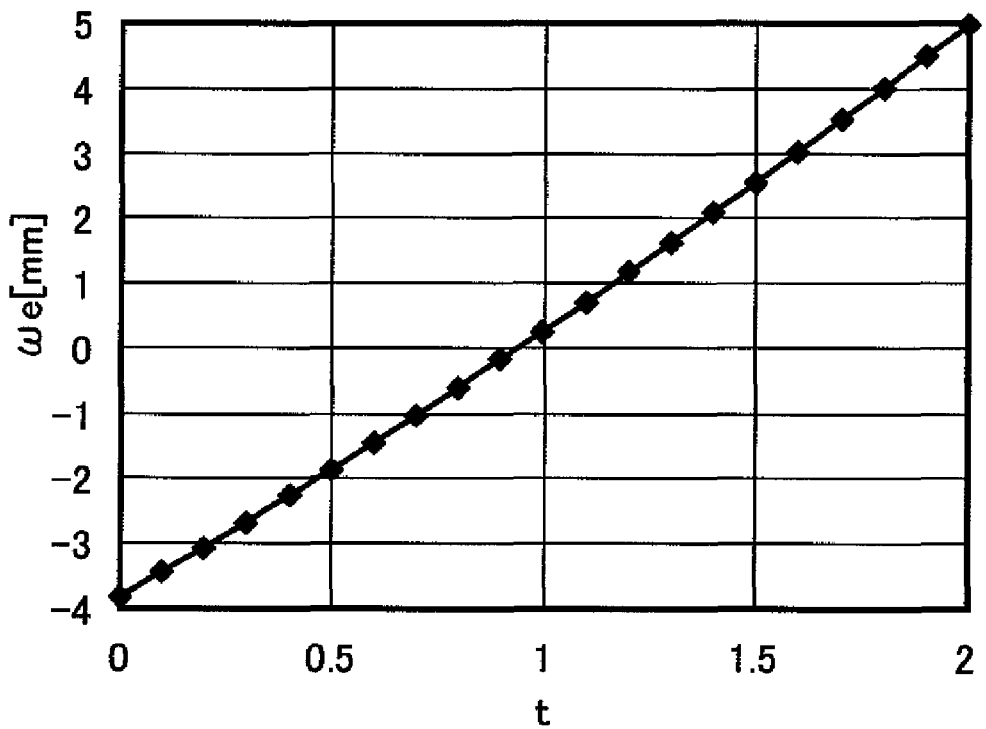
FIG. 10 is a graph for illustrating the exemplary embodiment of the present invention.

In the liquid crystal display portion 6 illustrated in FIG. 7, when the Young's modulus of the first polarizing plate 1, the second polarizing plate 2, the glass substrates 3 and 4, and the transparent thin film 11 are 2 GPa, 1.8 GPa, 71 GPa, and 1.6 GPa, respectively, when the thicknesses of the first polarizing plate 1, the second polarizing plate 2, and when the glass substrates 3 and 4 are 0.2 mm, 0.2 mm, and 0.7 mm, respectively, and the strains on the first polarizing plate 1, the second polarizing plate 2, and the transparent thin film 11 are 0.00953, 0.0142, and 0.003, respectively, the optimal thickness of the transparent thin film 11 given by Eq. 9 is 0.24 mm. FIG. 10 is a graph illustrating the relationship between the relative thickness of the transparent thin film 11 with the optimal thickness being 1, and the amount of warp at an end portion of the liquid crystal display portion. In FIG. 10, the horizontal axis represents the relative thickness t of the transparent thin film with the optimal thickness being 1, while the vertical axis represents the amount of warp $w_e$ at an end portion of the liquid crystal display portion. It may be seen that, indeed, the amount of warp may be reduced the most when the thickness is in the neighborhood of the optimal thickness, and that, when the thickness is 0.5 to 1.5 times as large as the optimal thickness, the amount of warp is reduced by more than half and sufficient effect may be produced.

If warp in the liquid crystal display portion may be reduced by the methods described above, the clearance between the liquid crystal display portion 6 and the frame member 8-1 and the clearance between the liquid crystal display portion 6 and the optical member group 9 described with reference to FIG. 2 may be eliminated or may be made to be smaller, and also, the mechanical reliability may be improved.

EXAMPLES

The present invention is described in further detail in the following by way of specific examples. The following examples are merely specific examples of the present invention and the present invention is by no means limited thereto.

In the following examples, the liquid crystal display portion is sized such that the diagonal length is 0.81 m and (the length of a long side): (the length of a short side) is 16:9.

Example 1

Figure 11:
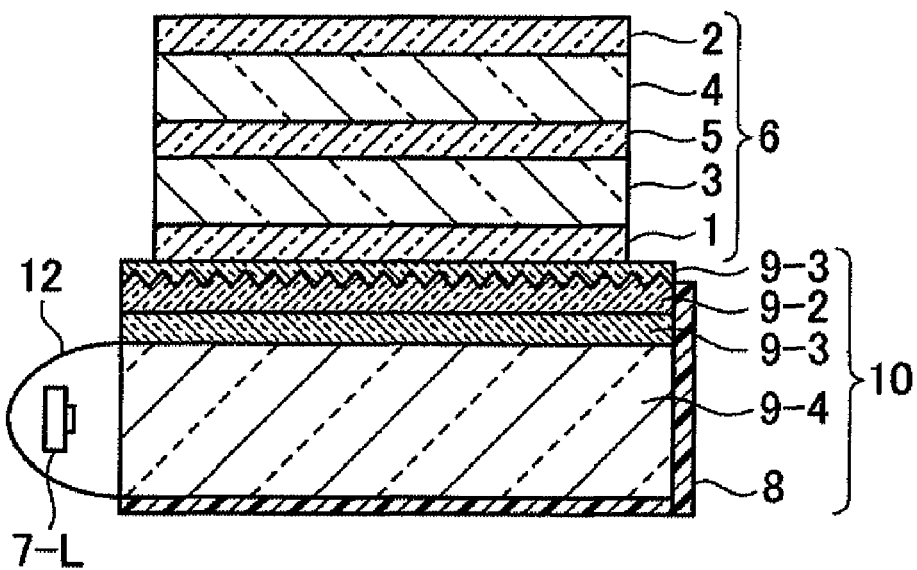
FIG. 11 illustrates a structure of a liquid crystal display device according to an example of the present invention.

FIG. 11 illustrates a structure of this example. In FIG. 11, a backlight device 10 is of a side edge type in which a light source 7 is provided at an end portion of the backlight device and light emitted from the light source is guided by a light guide plate 9-4 in a plane direction and is taken out to a front side. As the light source 7, a white light-emitting-diode (LED) is used. A reflector 12 reflects light emitted from the light source and makes the light efficiently enter the light guide plate. The light guide plate is formed of glass. In order to make directional light emitted from the liquid crystal display device, a prism sheet 9-2 is provided on the light guide plate 9-4. Both a bottom surface and a top surface of the prism sheet 9-2 are coated with a low refractive index layer 9-3 having a refractive index of 1.15.

The thickness of a first polarizing plate 1 and a second polarizing plate 2 is 0.2 mm. The absorption axis of the first polarizing plate 1 is in parallel with the short side of the liquid crystal display portion. The absorption axis of the second polarizing plate 2 is in parallel with the long side of the liquid crystal display portion. The thickness of a first substrate 3 and a second substrate 4 is 0.7 mm, the thickness of the prism sheet 9-2 is 0.15 mm, and the thickness of the light guide plate 9-4 is 2 mm.

Figure 12:
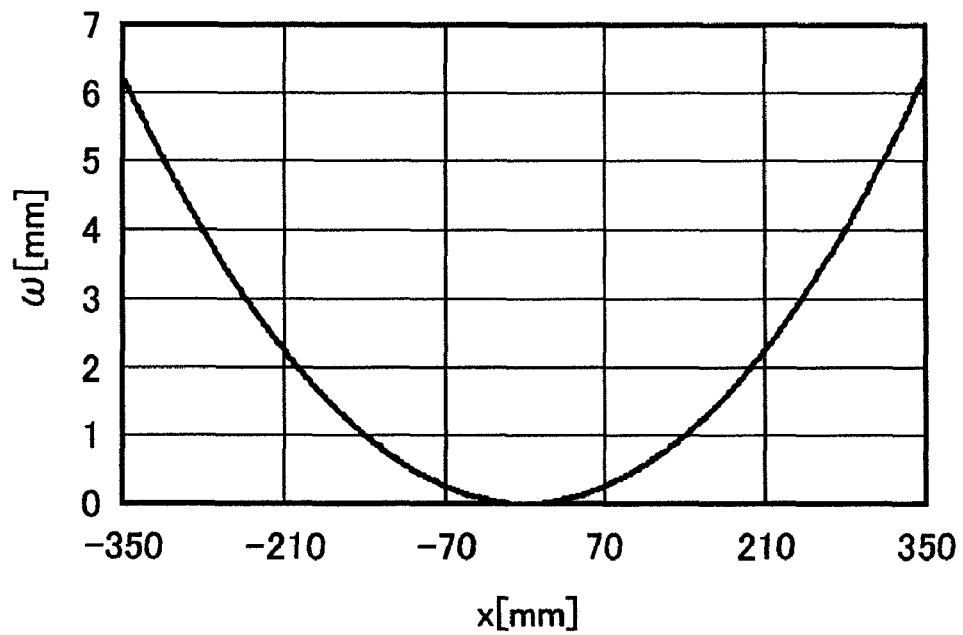
FIG. 12 is a graph for illustrating a shape of warp in a conventional liquid crystal display device.
Figure 13:
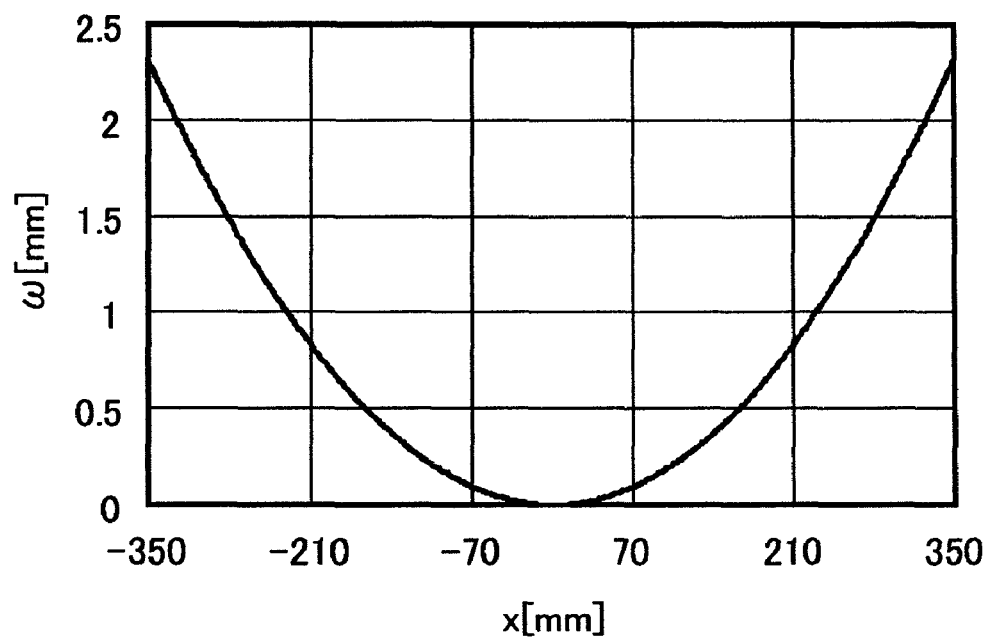
FIG. 13 is a graph for illustrating a shape of warp in the liquid crystal display device according to the example of the present invention.

In accordance with a conventional technology, a liquid crystal display portion 6 and the backlight device 10 were not in intimate contact with each other, and the liquid crystal display device was placed under a high temperature environment of 70° C. 8% RH. The shape of the warp in the long side direction was as illustrated in FIG. 12. In FIG. 12, the horizontal axis represents the position x of the liquid crystal display portion in the long side direction, while the vertical axis represents the amount of warp w of the liquid crystal display portion. Meanwhile, the liquid crystal display portion 6 and the optical member group 9-2, 9-3, and 9-4 are joined together so as to be in intimate contact with each other via an adhesive as illustrated in FIG. 11, and, similarly to the above-mentioned case, the liquid crystal display device was placed under a high temperature environment of 70° C. 8% RH. The shape of the warp in the long side direction was as illustrated in FIG. 13. In FIG. 13, the horizontal axis represents the position x of the liquid crystal display portion in the long side direction, while the vertical axis represents the amount of warp w of the liquid crystal display portion. It may be seen that the amount of warp at an end portion was reduced by more than half and significant improvement was made. The optical characteristics of the liquid crystal display device were almost the same.

Example 2

Figure 14:
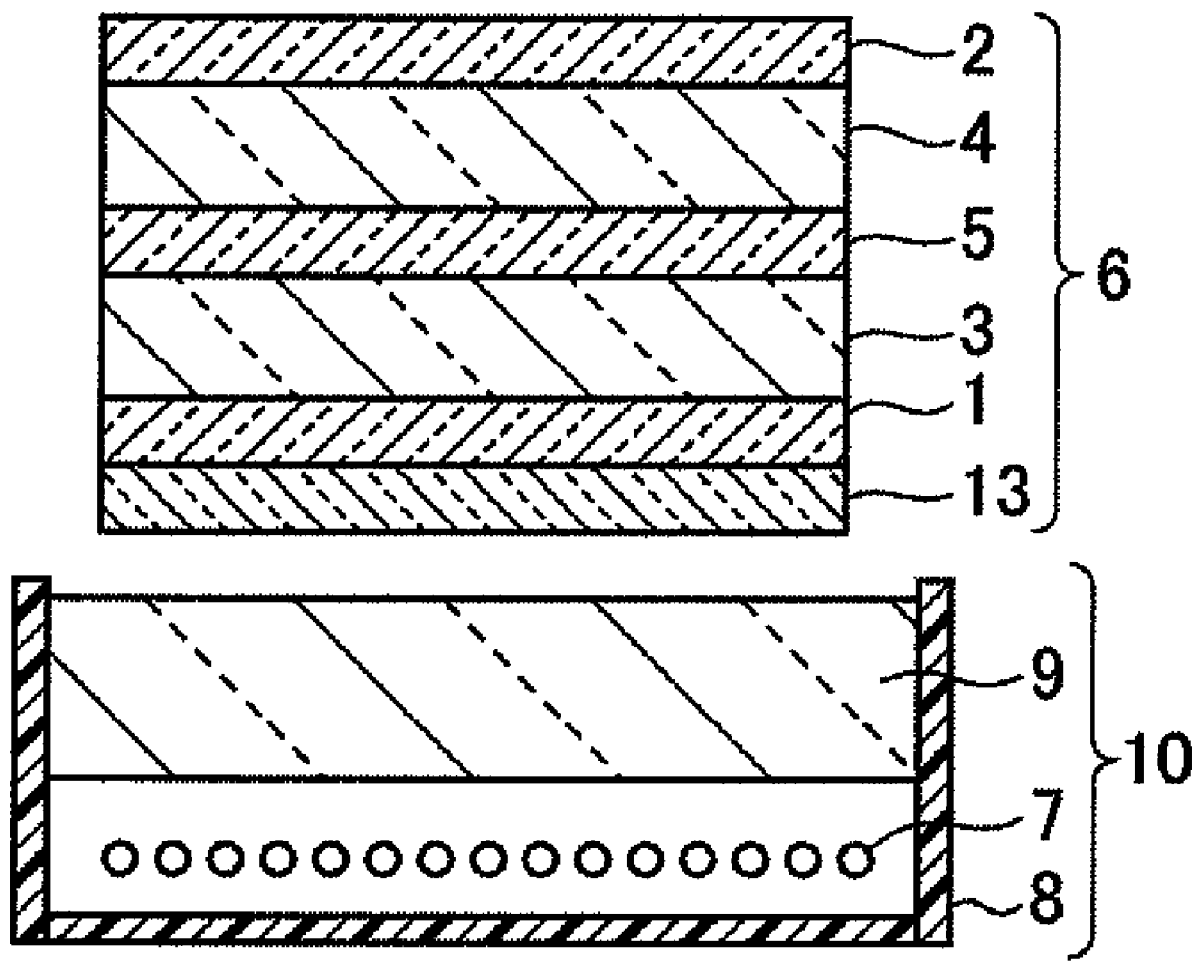
FIG. 14 illustrates a structure of a liquid crystal display device according to another example of the present invention.

FIG. 14 illustrates a structure of this example. In this example, differently from the case of Example 1, as in the conventional case, the liquid crystal display portion 6 and the optical member group 9 are not joined together. A polyethylene-terephtalate (PET) film 13 is joined to the first polarizing plate 1 so as to be in intimate contact therewith.

The Young's modulus of the first polarizing plate 1, the second polarizing plate 2, the glass substrates 3 and 4, and the PET film 13 which were used were 2 GPa, 1.8 GPa, 71 GPa, and 1.6 GPa, respectively. The thicknesses of the first polarizing plate 1, the second polarizing plate 2, and the glass substrates 3 and 4 were 0.2 mm, 0.2 mm, and 0.7 mm, respectively. The strains per unit length on the first polarizing plate 1, the second polarizing plate 2, and the PET film 13 under a high temperature and high humidity environment were 0.00953, 0.0142, and 0.003, respectively.

Figure 15:
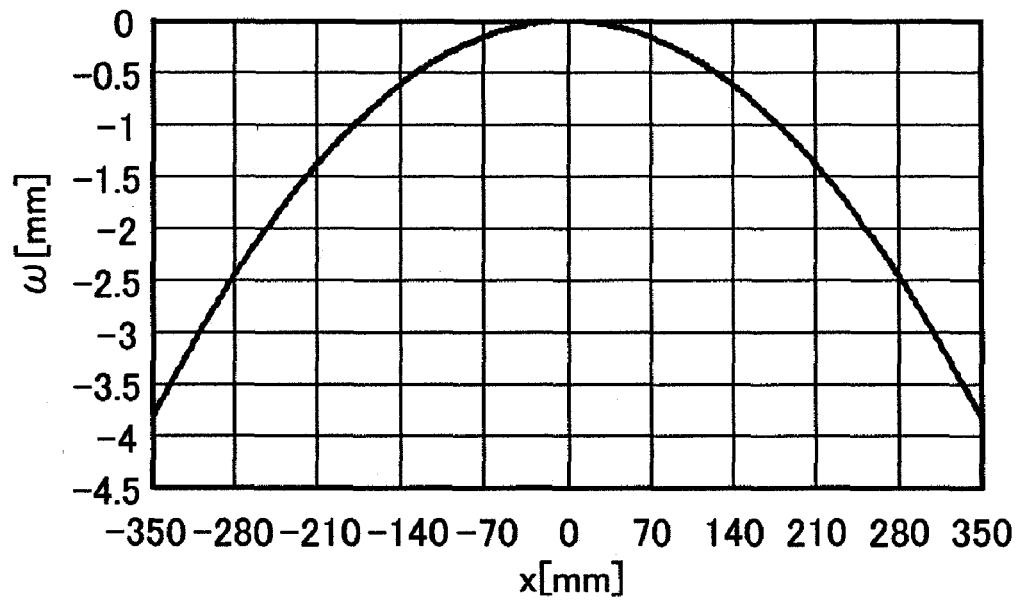
FIG. 15 is a graph for illustrating a shape of warp in a conventional liquid crystal display device.
Figure 16:
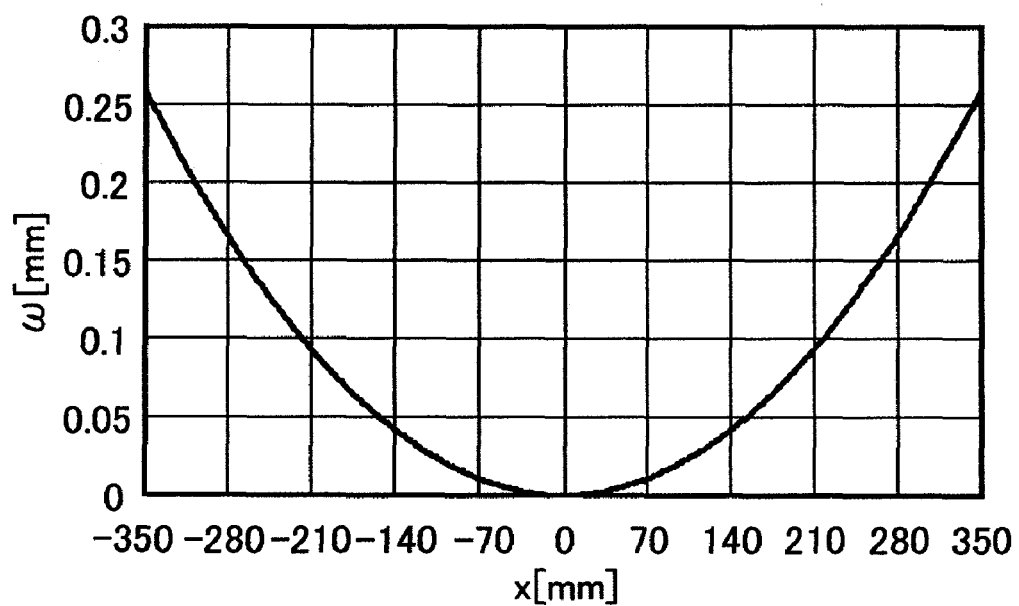
FIG. 16 is a graph for illustrating a shape of warp in the liquid crystal display device according to the another example of the present invention.

When the PET film was not provided, the shape of the warp was as illustrated in FIG. 15. Meanwhile, when the PET film having a thickness of 0.24 mm was provided as illustrated in FIG. 14, the shape of the warp under the same environment was as illustrated in FIG. 16 and significant improvement was made. In FIGS. 15 and 16, the horizontal axis represents the position x of the liquid crystal display portion in the long side direction, while the vertical axis represents the amount of warp w of the liquid crystal display portion.

Example 3

Figure 17:
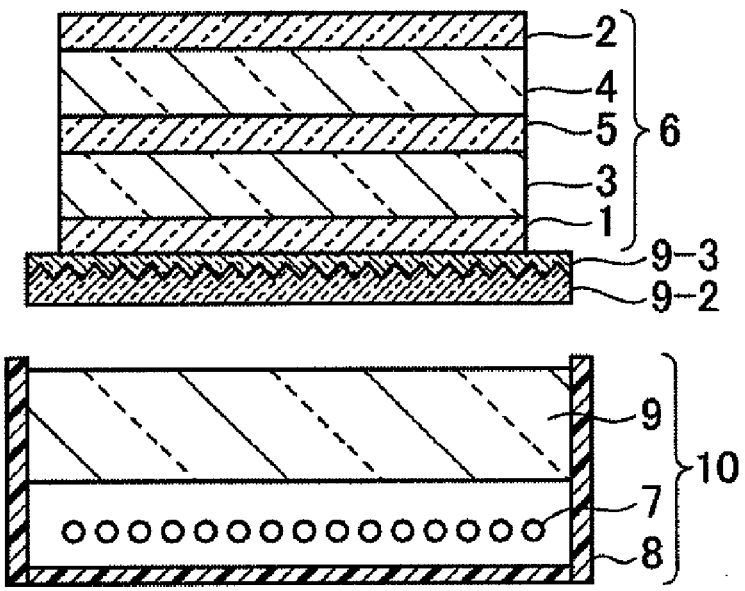
FIG. 17 illustrates a structure of a liquid crystal display device according to still another example of the present invention.

FIG. 17 illustrates a structure of this example. A surface with a prism structure of the prism sheet 9-2 is coated with the low refractive index layer 9-3 having a refractive index of 1.15. The prism sheet 9-2, the low refractive index layer 9-3, and the liquid crystal display portion 6 are joined together so as to be in intimate contact with one another via an adhesive. In this example, an optical member group 9 except for the prism sheet is not joined to the liquid crystal display portion 6.

Figure 18:
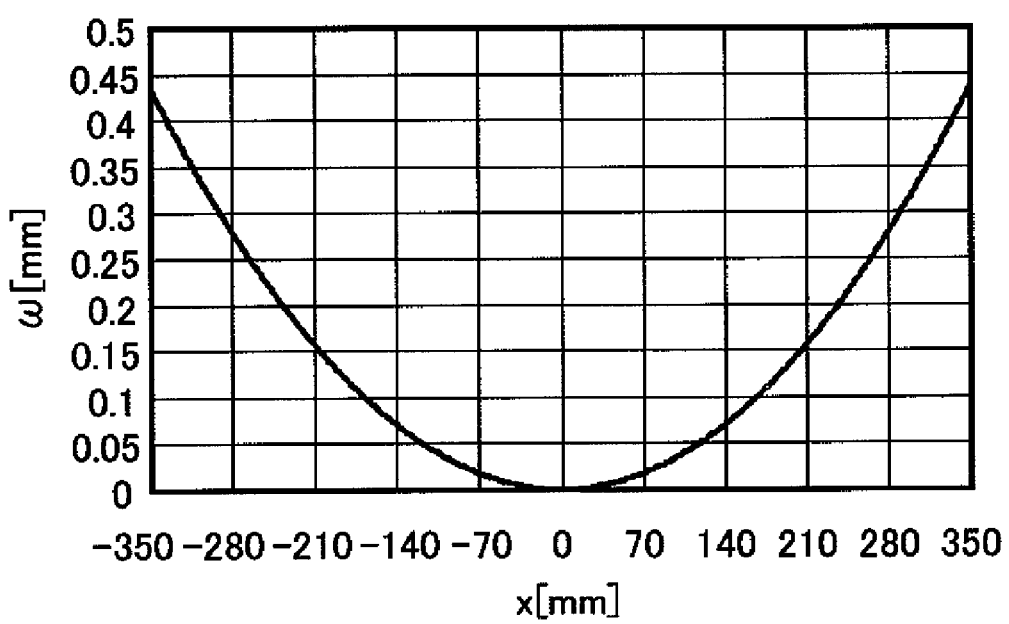
FIG. 18 is a graph for illustrating a shape of warp in the liquid crystal display device according to the still another example of the present invention.

As the first polarizing plate 1, the second polarizing plate 2, and the glass substrates 3 and 4, ones similar to those of Example 2 were used. A support base of the prism sheet 9-2 was a PET film having a thickness of 0.25 mm. The shape of the warp in the liquid crystal display portion under a high temperature and high humidity environment was as illustrated in FIG. 18. In FIG. 18, the horizontal axis represents the position x of the liquid crystal display portion in the long side direction, while the vertical axis represents the amount of warp w of the liquid crystal display portion. It may be seen that significant improvement was made compared with the case illustrated in FIG. 15.

Example 4

Figure 19:
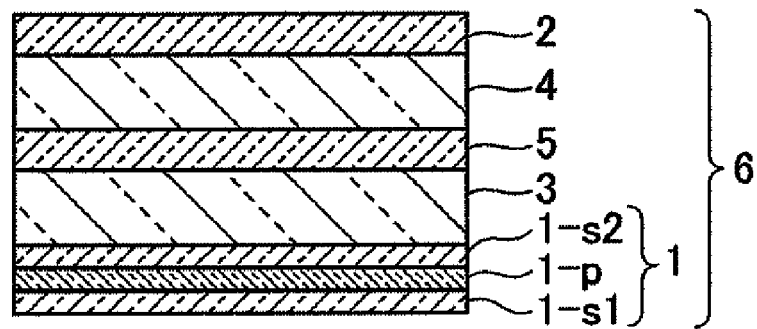
FIG. 19 illustrates a structure of a liquid crystal display device according to yet another example of the present invention.

FIG. 19 illustrates a structure of this example. In a typical polarizing plate used in a liquid crystal display device, a polarizing layer is sandwiched between support bases. In FIG. 19, reference numeral 1-p denotes a polarizing layer of a first polarizing plate and reference numerals 1-s1 and 1-s2 denote support bases of the first polarizing plate.

As described above, the support base 1-s1 greatly affects the display performance of the liquid crystal display device and it is difficult to adjust the thickness and the like thereof. Therefore, in this example, the support base 1-s2 is used similarly to the PET film of Example 2.

Figure 20:
FIG. 20 illustrates a structure of a polarizing plate according to the yet another example of the present invention.

In this case, the first polarizing plate as expressed in Eq. 9 is assumed to include only the polarizing layer 1-p and the support base 1-s2 as illustrated in FIG. 20, and the strain, the Young's modulus, and the thickness are determined. Then, according to Eq. 9, the thickness of the support base 1-s1 is determined.

Compared with Examples 2 and 3, this example may further suppress increase in the material cost and increase in the thickness of the liquid crystal display portion due to an additional member. Further, in this example, the support base outside the first polarizing plate (on a side opposite to a liquid crystal layer) was adjusted. However, a support base outside the second polarizing plate may be adjusted according to Eq. 10.

Example 5

Figure 21:
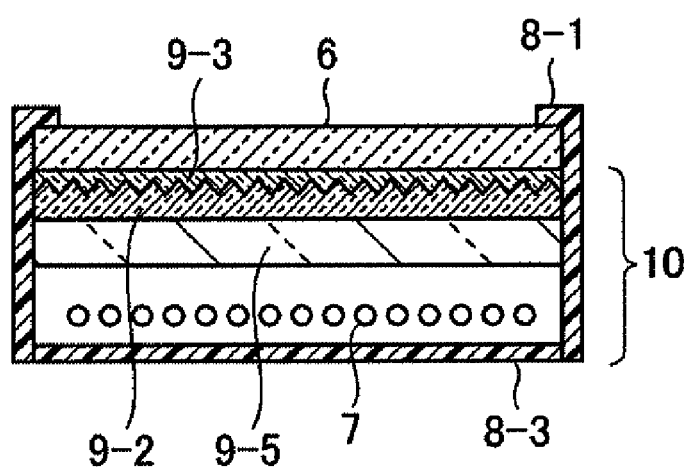
FIG. 21 illustrates a structure of a liquid crystal display device according to still another example of the present invention.

FIG. 21 illustrates a structure of this example. If warp in the liquid crystal display portion is reduced by any one of the methods described above, the clearance between the liquid crystal display portion 6 and the frame member 8-1 and the clearance between the liquid crystal display portion 6 and the optical member group 9 described with reference to FIG. 2 may be eliminated.

In this example, warp in the liquid crystal display portion is reduced by a method similar to the one in Example 3. A surface with a prism structure of the prism sheet 9-2 is coated with the low refractive index layer 9-3 having a refractive index of 1.15. The prism sheet 9-2, the low refractive index layer 9-3, and the liquid crystal display portion 6 are joined together so as to be in intimate contact with one another via an adhesive. In this example, an optical member group 9-5 except for the prism sheet is not joined to the liquid crystal display portion 6.

Figure 1:
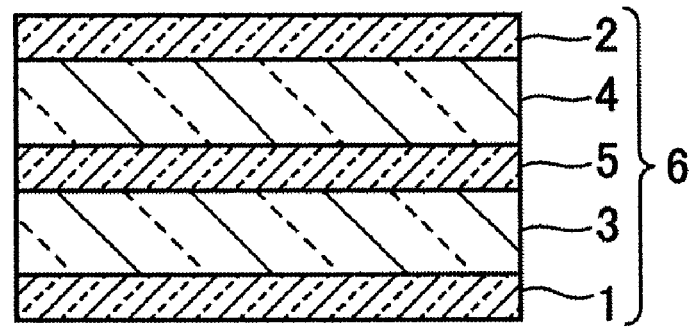
FIG. 1 illustrates a structure of a conventional liquid crystal display device.
Figure 1:
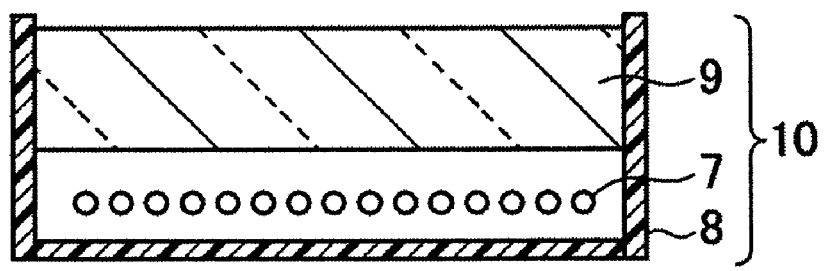
Figure 2:
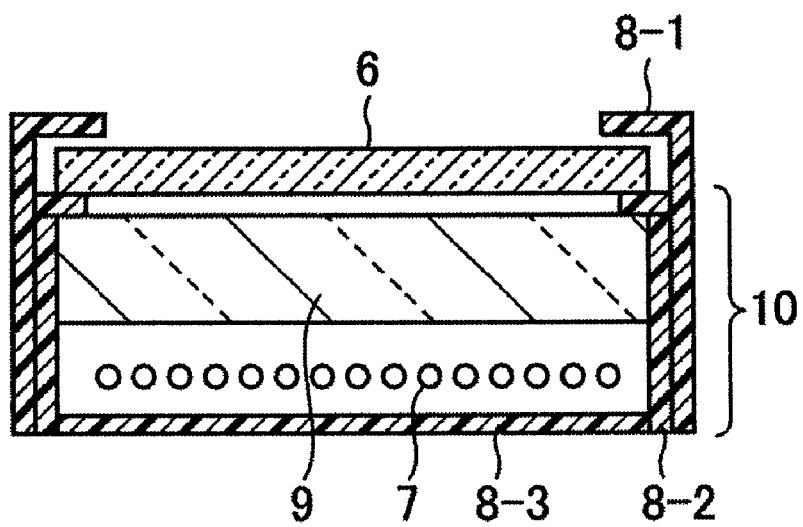
FIG. 2 illustrates a structure of the conventional liquid crystal display device.

In this example, it is not necessary to provide a clearance between the liquid crystal display portion 6 and the optical member group 9 as illustrated in FIG. 2. Therefore, a side frame member 8-2 of a backlight device is removed. By using the frame member 8-1 both as a side frame of the backlight device and as a front frame of a liquid crystal display device, the number of parts is reduced.

It is to be noted that, according to the study by the inventors of the present invention, if the clearance between the liquid crystal display portion 6 and the frame member 8-1 is equal to or smaller than 1.5 mm, sufficient mechanical reliability may be secured even with regard to a large screen liquid crystal display device having a diagonal length of 0.65 m or larger.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
    a liquid crystal display portion; and
    a backlight device provided on a side opposite to a display surface of the liquid crystal display portion, wherein:
    the liquid crystal display portion comprises a polarizing plate;
    the backlight device comprises N (N≧1) optical members; and
    when the N optical members are denoted by reference numerals 1, 2, . . . , and N in the stated order from a side on which the liquid crystal display portion is provided,
    the optical member 1 is brought into intimate contact with the liquid crystal display portion via an adhesive, and
    strain per unit length on the optical member 1 at least one of −10 to 10° C. and 40 to 70° C. is ⅕ or smaller of strain per unit length on the polarizing plate.

2. The liquid crystal display device according to claim 1, wherein:
    at least one optical member of the N optical members has a surface with concavo-convex shape formed thereon; and
    the liquid crystal display device further comprises a low refractive index layer having a refractive index of 1 or larger and 1.4 or smaller at the surface with the concavo-convex shape formed thereon one of between the optical member having the concavo-convex shape formed thereon and an optical member adjacent to the optical member having the concavo-convex shape formed thereon, or between the optical member having the concavo-convex shape formed thereon and the liquid crystal display portion.

3. The liquid crystal display device according to claim 1, wherein:
    at least one optical member of the N optical members is a light guide plate for guiding light emitted from a light source of the backlight device in a planar direction; and
    the liquid crystal display device further comprises a low refractive index layer having a refractive index of 1 or larger and 1.4 or smaller on a light emitting surface side of the light guide plate one of between the light guide plate and an optical member adjacent to the light guide plate, or between the light guide plate and the liquid crystal display portion.

4. The liquid crystal display device according to claim 1, wherein an optical member having a highest flexural rigidity among the N optical members comprises glass as a main material.

5. The liquid crystal display device according to claim 1, further comprising a frame member for, by pressing an end portion of the liquid crystal display portion from a light emitting surface side of the liquid crystal display portion, fixing a position of the liquid crystal display portion,
   wherein a clearance between an outermost surface on the light emitting side of the liquid crystal display portion and the frame member is equal to or smaller than 1.5 mm.

6. A liquid crystal display device, comprising:
   a liquid crystal display portion; and
   a backlight device provided on a side opposite to a display surface of the liquid crystal display portion, wherein:
   the liquid crystal display portion comprises a polarizing plate;
   the backlight device comprises N (N≧2) optical members; and
   when the N optical members are denoted by reference numerals 1, 2, . . . , and N in the stated order from a side on which the liquid crystal display portion is provided,
   the optical member 1 is brought into intimate contact with the liquid crystal display portion via an adhesive, and
   the optical member M (1<M≦N) is brought into intimate contact with the optical member M−1 via an adhesive, and strain per unit length on an optical member having a highest flexural rigidity (product of Young's modulus and second moment of area) among the N optical members at least one of −10 to 10° C. and 40 to 70° C. is ⅕ or smaller of strain per unit length on the polarizing plate.

7. A liquid crystal display device, comprising:
   a liquid crystal display portion; and
   a backlight device provided on a side opposite to a display surface of the liquid crystal display portion, wherein:
   the liquid crystal display portion comprises:
   a first polarizing plate on a light incident side;
   a second polarizing plate on a light emitting side; and
   a transparent layer provided on a light incident side of the first polarizing plate; and
   when a thickness of the transparent layer is represented by $h_t$ and expressed as:

$$h_{t0} = \frac{\varepsilon_{p2}E_{p2}h_{p2}(h_{p2}+h_g) - \varepsilon_{p1}E_{p1}h_{p1}(h_{p1}+h_g)}{\varepsilon_t E_t (h_g + 2h_{p1})} \quad \text{[Equation 1]}$$

where $\varepsilon$, E, and h are strain per unit length under an environment in which temperature of the liquid crystal display portion is at least one of −10 to 10° C. and 40 to 70° C., and a Young's modulus, a thickness of each member, respectively, and indexes p1, p2, g, and t correspond to the first polarizing plate, the second polarizing plate, a substrate of the liquid crystal display portion, and the transparent layer, respectively, $0.5h_{t0} \leq h_t \leq 1.5h_{t0}$ is satisfied.

8. The liquid crystal display device according to claim 7, wherein the transparent layer comprises an optical member of the backlight device.

9. The liquid crystal display device according to claim 7, wherein the transparent layer comprises a support base provided on a side of the backlight device of the first polarizing plate.

10. The liquid crystal display device according to claim 7, wherein:
    the backlight device comprises N (N≧1) optical members;
    no structure is provided for providing a clearance between the liquid crystal display portion and the backlight device; and
    the liquid crystal display portion is directly mounted on the N optical members.

11. A liquid crystal display device, comprising:
    a liquid crystal display portion; and
    a backlight device provided on a side opposite to a display surface of the liquid crystal display portion, wherein:
    the liquid crystal display portion comprises:
    a first polarizing plate on a light incident side;
    a second polarizing plate on a light emitting side; and
    a transparent layer provided on a light emitting side of the second polarizing plate; and
    when a thickness of the transparent layer is represented by $h_t$ and expressed as:

$$h_{t0} = \frac{\varepsilon_{p1}E_{p1}h_{p1}(h_{p1}+h_g) - \varepsilon_{p2}E_{p2}h_{p2}(h_{p2}+h_g)}{\varepsilon_t E_t (h_g + 2h_{p2})} \quad \text{[Equation 2]}$$

where $\varepsilon$, E, and h are strain per unit length under an environment in which temperature of the liquid crystal display portion is at least one of −10 to 10° C. and 40 to 70° C., and a Young's modulus, a thickness of each member, respectively, and indexes p1, p2, g, and t correspond to the first polarizing plate, the second polarizing plate, a substrate of the liquid crystal display portion, and the transparent layer, respectively, $0.5h_{t0} \leq h_t \leq 1.5h_{t0}$ is satisfied.

12. The liquid crystal display device according to claim 11, wherein the transparent layer comprises a surface treated layer of the second polarizing plate.

13. The liquid crystal display device according to claim 11, wherein the transparent layer comprises a support base provided on the light emitting side of the second polarizing plate.

* * * * *